(12) United States Patent
Matsuoka et al.

(10) Patent No.: US 6,578,748 B2
(45) Date of Patent: Jun. 17, 2003

(54) CONNECTING ROD BREAKING AND DIVIDING DEVICE

(75) Inventors: Hiroyuki Matsuoka, Kanagawa (JP); Toshio Watanabe, Kanagawa (JP); Katsuaki Aihara, Kanagawa (JP); Hirotsugu Zushi, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/384,990

(22) Filed: Aug. 30, 1999

(65) Prior Publication Data

US 2002/0158099 A1 Oct. 31, 2002

(30) Foreign Application Priority Data

Aug. 30, 1999 (JP) .......................................... 10-259423

(51) Int. Cl.[7] .................................................. B26F 3/00
(52) U.S. Cl. ......................... 225/103; 225/97; 225/100; 225/96; 29/413; 29/888.09
(58) Field of Search ..................... 225/96, 94, 96.5, 225/101, 103, 97, 93; 29/413, 414, 416, 888.09, 888.091, 888.092; 173/201; 74/579 E

(56) References Cited

U.S. PATENT DOCUMENTS

| | | | | |
|---|---|---|---|---|
| 316,430 A | * | 4/1885 | Derby | ......................... 225/93 |
| 1,919,801 A | * | 7/1933 | Newsom | ................... 125/23.01 |
| 3,998,201 A | * | 12/1976 | Miura et al. | .............. 125/23.01 |
| 5,105,538 A | * | 4/1992 | Hoag et al. | .............. 29/888.09 |
| 5,169,046 A | * | 12/1992 | Miessen et al. | .............. 225/100 |
| 5,263,622 A | * | 11/1993 | Henzler et al. | ............. 225/103 |
| 5,503,317 A | * | 4/1996 | Jones et al. | .................. 225/103 |
| 5,568,891 A | * | 10/1996 | Hoag et al. | .................... 225/93 |

OTHER PUBLICATIONS

Japanese Patent Office—Patent Abstracts of Japan, "Manufacture of Connecting Rod and its Device" Publication No. 05277843 Oct. 26, 1993 Appl'n No. 04071354; Applicant: Mazda Motor Corp.; Inventor: Kameda Yoichi, et al.

Japanese Patent Office—Patent Abstracts of Japan, "Manufacture of Split Bearing" Publication No. 06091438 May 4, 1994 Appl'n No. 04248298; Applicant: Toyota Motor Corp.; Inventor: Okamoto Tomio.

* cited by examiner

Primary Examiner—Boyer D. Ashley
(74) Attorney, Agent, or Firm—Jones, Tullar & Cooper, P.C.

(57) ABSTRACT

A device for breaking and dividing an enlarged bearing portion of a connecting rod into a main body portion and a bearing cap portion includes a split mold which is insertable into an aperture in the enlarged bearing portion. A pressing mechanism includes pressure caps engaging dramatically opposite points on the outer surface of the enlarged bearing portion at locations where the beating portion is to be broken and divided when a wedge is forced into the split mold.

5 Claims, 4 Drawing Sheets ic field of the invention

CONNECTING ROD BREAKING AND DIVIDING DEVICE

TECHNICAL FIELD OF THE INVENTION

The present invention relates to a pressurizing mechanism for a con'rod (connecting rod) used in a breaking and dividing device (fracture process) for the connecting rod of an internal combustion engine or the like.

DESCRIPTION OF THE PRIOR ART

The process of breaking and dividing a connecting rod, hereinafter referred to as a con'rod, as follows: As shown in FIG. 5, a con'rod 1 is made in prior art in such a way that a con'rod main body 2 and a bearing cap portion 3 are formed as one piece, for example, by sinter forging, and a notch 5a is made in a face which is to be divided. This face is on the inner surface of a bearing portion 5 on a large end portion 4 of the con'rod.

A small end portion of the con'rod 1, as shown in FIG. 5 and FIG. 6, is fitted onto a small end reference pin 12 carried on a support stand 11. Left and right seats 3a of the bearing cap portion 3 are mounted on a movable plate 14 on the bearing cap portion side of the large end portion 4. The plate 14 is located face to face with a stationary plate 13 which is on the main body side of the large end portion 4 and both plate 13 and plate 14 are on the support stand 11. Tips 15a of a movable pressing portion 15 are pressed to be in contact with seats 3a. Further, on the stationary plate 13 on the main body side, an escaping force receiving pin 16 is mounted so as to be in contact with a part of a shoulder 4a formed on the bearing cap portion 3 of the large end portion 4 of the con'rod 1. When the con'rod is so mounted on platform 11, a wedge 18 is forced into a split mold 17 fitted into the bearing portion 5 on the large end portion side, and consequently, the main body 2 and the bearing cap portion 3 are broken and divided at the notch 5a. Furthermore, reference numeral 19 denotes a guide plate for the movable plate 14, which is fixed on the support stand 11.

A mechanism in which the notch 5a is automatically formed so that breaking and dividing may securely be performed has been disclosed in Japanese Laid-Open Patent Application No. H6-91438. As described in that application, left and right expansion molds (a split mold) are provided face to face in the direction in which the main body and the bearing cap portion are to be separated from each other, in a large end hole, or bearing portion. A punch or wedge to be forced into a mid position thereof is provided, and breaking chips arranged with the tips facing to the inner surface of the large end hole bearing portion are provided at both ends at right angles to the direction in which the bearing cap portion is broken and separated by the punch. By forcing the punch (wedge), a load in the breaking and separating direction is given to the bearing cap portion or the like, and at the same time, the breaking chips 14 and 15 cause a concentrated load to be applied to the portion to be broken and separated. Accordingly, the part to be broken and separated can easily be deformed, and it is possible to securely make this part the breaking start point, and in the meantime, this can automatically be performed with no trouble by forcing the punch.

However, in a mechanism like the one described in the Publication, in which a notch is not formed in advance and a concentrated load is applied to the portion to be broken and separated by breaking chips from the inside of the large end hole (bearing portion) by utilizing the forcing of the punch (wedge) for giving a load in the breaking and separating direction to the bearing cap portion or the like, this concentrated load is applied suddenly in some cases, and therefore as shown in FIG. 7, the breaking and separating (dividing) are finished in the state shown by A, B where the breaking and separating are deviating from the line a—a passing through the face to be broken and divided in some cases, and there are some cases where it cannot be used as a con'rod.

SUMMARY OF THE INVENTION

The present inventors have found as a result of research that the breaking and dividing of a con'rod can be performed precisely at the face to be broken and divided and with only a small deformation, by performing the breaking and dividing while applying force to points on the outside of the bearing cap portion of the large end portion of a con'rod, and have reached the present invention.

It is an object of the present invention to provide a pressurizing mechanism for breaking and dividing a con'rod, in which a wedge is forced through a split mold into a bearing portion on the large end portion side of a con'rod made in such a way that the bearing cap portion included in the large end portion and the main body side to be connected to the cap portion are manufactured as one piece. Breaking and dividing the main body and the bearing cap portion is performed so that the main body and the bearing cap portion may be broken and divided precisely at the face to be broken and divided, and further, the deformation at that moment can be made minimum.

In order to achieve the above object, a pressurizing mechanism of the con'rod breaking and dividing device of the present invention includes a mechanism to press a point to be broken and divided on the outside of the large end portion of the con'rod. In addition, a wedge is forced through a split mold into a bearing portion on the large end portion side of a con'rod made in such a way that a bearing cap portion included in the large end portion and a main body side to be connected to the cap portion are formed as one piece so as to break and divide the main body and the bearing cap portion.

DETAILED DESCRIPTION

Figure 1:
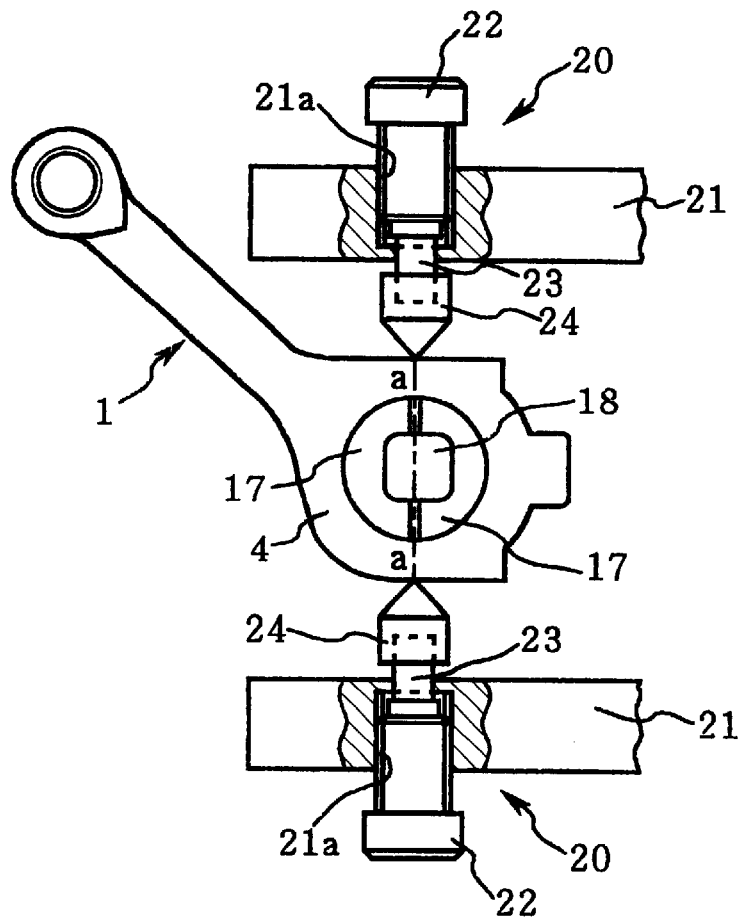
FIG. 1 is a plan view showing one embodiment of a pressurizing mechanism of a con'rod breaking and dividing device of the present invention.
Figure 2:
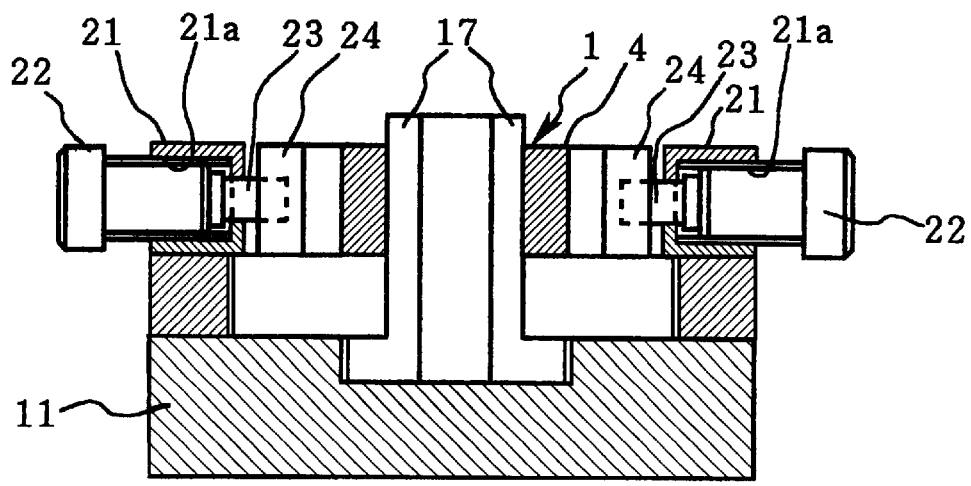
FIG. 2 is a front view showing one embodiment of a pressurizing mechanism of a con'rod breaking and dividing device of the present invention.

The present invention will be described in detail with reference to FIG. 1 to FIG. 4. In FIG. 1 to FIG. 4, reference numeral 20 denotes a pressurizing mechanism of the present invention, and first, this will be described by using FIG. 1 and FIG. 2 showing only the mechanism. The present pressurizing mechanism is arranged on a pair of support blocks 21 fixed in parallel on a support stand 11. Between the pair of support blocks 21 on the support stand 11, a large end portion 4 of a con'rod 1 is fixed such that the line a—a passing through the face to be broken and divided is at right angles to the support block 21. At the corresponding position of the support block 21 on the extension of the line a—a, a screw hole 21a is formed from the outside and a pressurizing bolt 22 is screwed in. At the tip of the bolt, an angle pressurizing cap 24 whose tip faces and contacts the face to be broken and divided is attached through a rotatable rod 23. The rod 23 can be connected to a hydraulic operating cylinder (not shown in the figure) instead of the pressurizing bolt 22, if desired.

Figure 3:
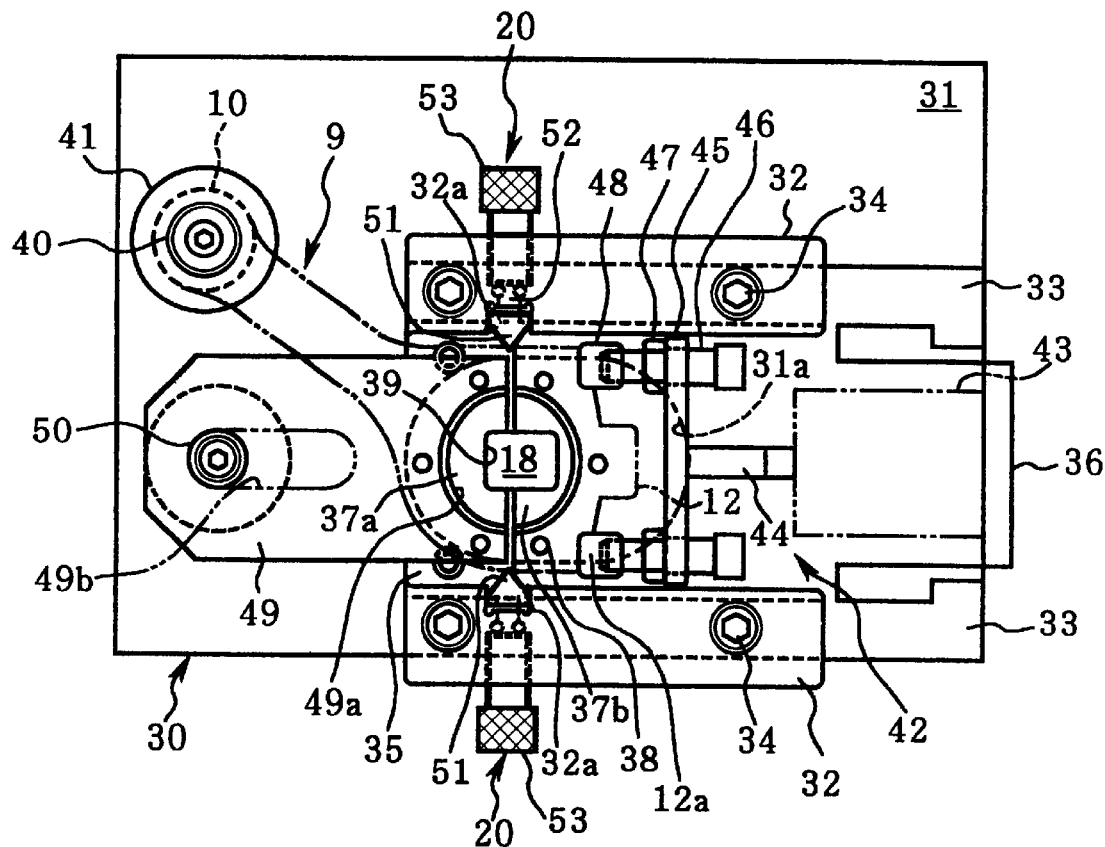
FIG. 3 is a plan view showing one embodiment of con'rod breaking and dividing device to which a pressurizing mechanism of the present invention is assembled.
Figure 4:
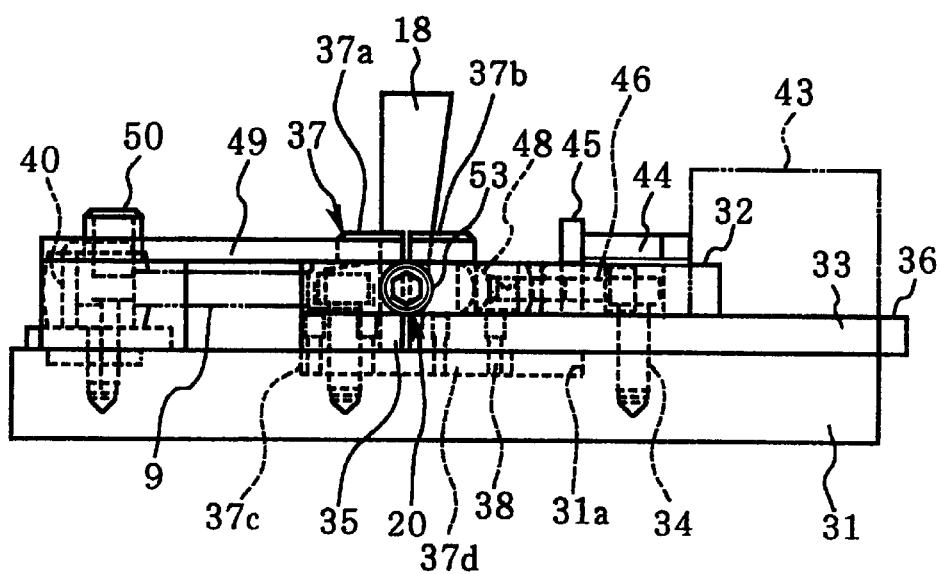
FIG. 4 is a front view showing one embodiment of a con'rod breaking and dividing device shown in FIG. 3.
Figure 5:
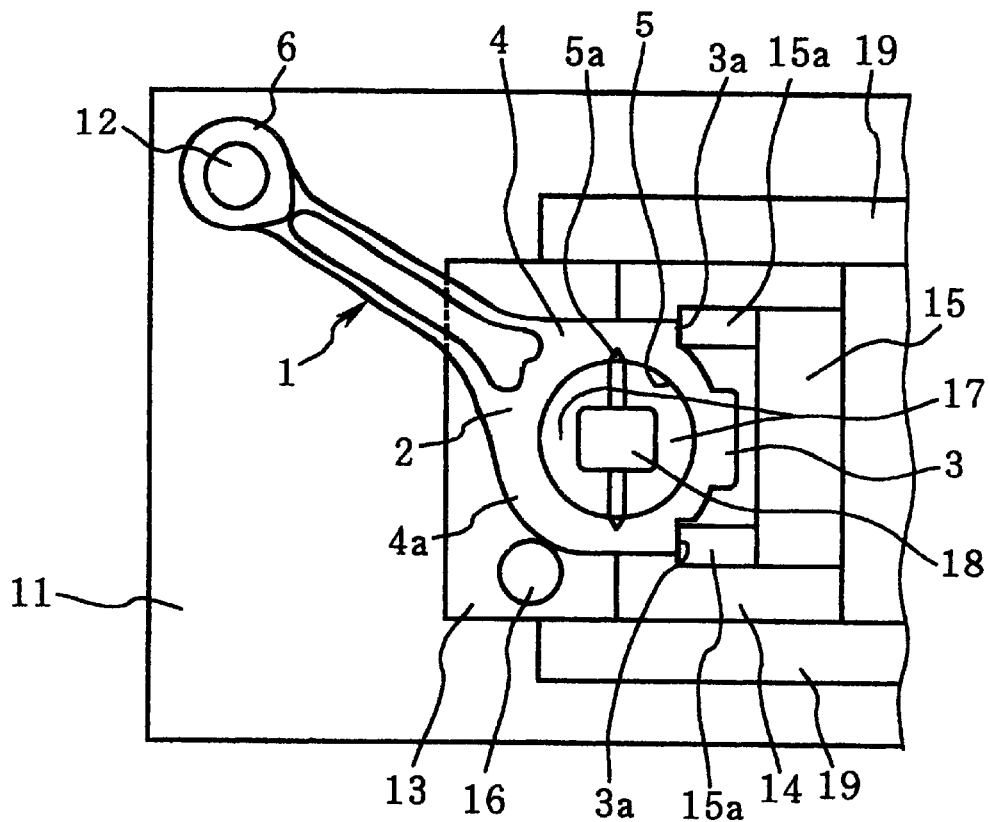
FIG. 5 is a plan view of the main part of a con'rod breaking and dividing device having no pressurizing mechanism.
Figure 6:
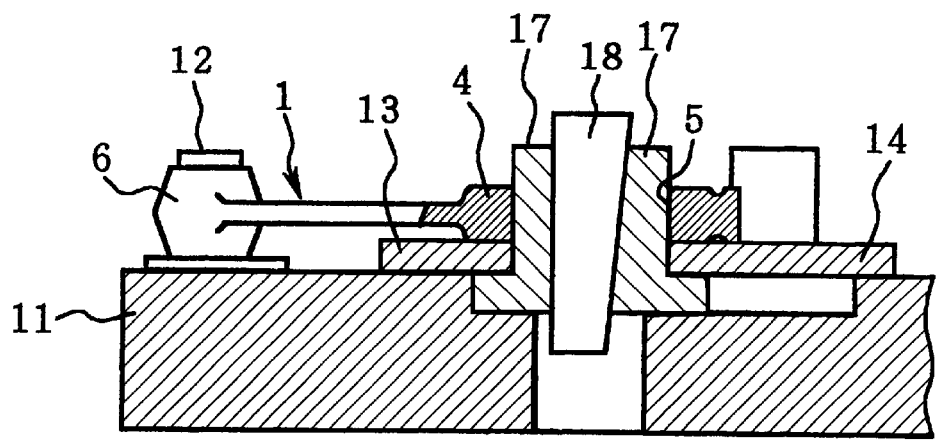
FIG. 6 is a cross sectional view of a main part of a con'rod breaking and dividing device shown in FIG. 5.
Figure 7:
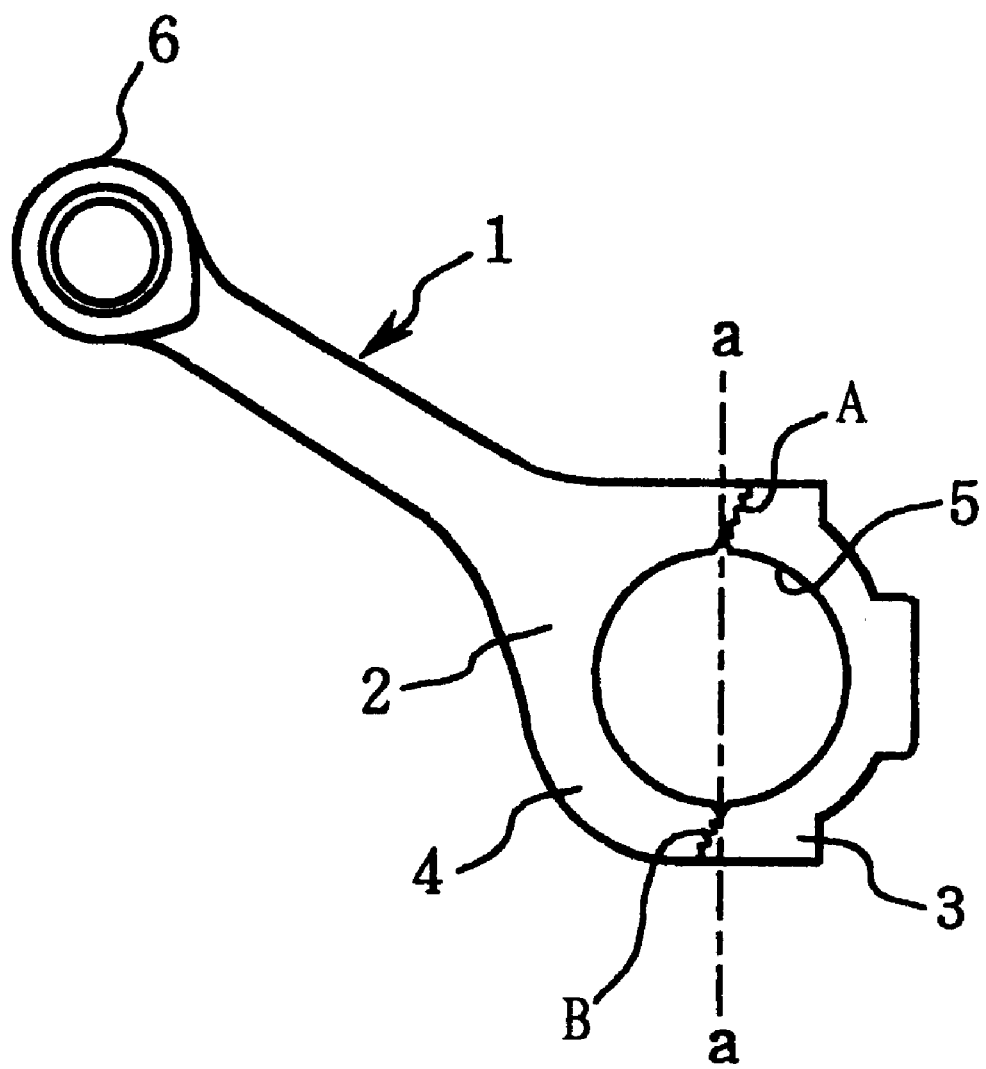
FIG. 7 is a plan view showing one embodiment of a con'rod in which breaking and dividing are not performed at a face to be broken and divided.

FIG. 3 and FIG. 4 show a con'rod breaking and dividing device 30 to which the pressurizing mechanism 20 of the present invention is assembled. In the longitudinal direction of a support stand 31, a pair of guide rails 33 are fixed to the support stand 31 through pressing plates 32 by bolts 34. A stationary plate 35 on the con'rod main body side and a movable plate 36 on the bearing cap side are arranged so that they may be caught between the pair of guide rails 33 and may stand face to face.

Reference numeral 37 denotes a split mold, with half-round left and right portions 37a, 37b arranged between the stationary plate 35 and the movable plate 36 formed like a half circle to be in accord with the body portion of the spilt mold 37. A flange portion 37c formed at the lower end thereof is free, but a similar flange portion 37d thereof is fixed to the movable plate 36 by a small bolt 38 or a knock pin. Furthermore, a wedge hole 39 in which a wedge 18 is forced is formed in split mold 37, and the hole 39 is vertical at the left portion 37a in FIG. 3 and FIG. 4, but it is inclined to fit with the shape of the wedge 18 at the right portion 37b. The flange portions 37c, 37d in the split mold 37 are movably fitted into an elliptic hollow 31a formed in the upper surface of the support stand 31.

Reference numeral 40 denotes a small end reference pin mounted at a specified position of the support stand 31 to which a small end portion 6 of the con'rod 1 is fitted, and around it, an adjusting ring 41 is provided for keeping the con'rod 1 horizontal.

Reference numeral 42 denotes a pressing mechanism on the bearing cap portion side to press the bearing cap portion 3 of the con'rod 1. The pressing mechanism is arranged on the movable plate 36, and is composed such that a length adjusting bolt 46 is screwed at both ends of a support plate 45 attached to the tip of a rod 44 of, for example, a hydraulic operating cylinder 43. Bolt 46 is fixed by an adjusting nut 47, and at the tip of the bolt 46, a pressing hardware 48 in contact with left and right seats 3a of the bearing cap portion 3 is attached.

Reference numeral 49 denotes a clamping plate having a width a little narrower than the width of the large end portion 4 of the con'rod 1, and in the one shown in the figure, on the side to be in contact with the large end portion 4 of the con'rod 1, a semicircular concave portion 49a is formed in accord with the bearing portion 5. On the opposite side thereof, an elongated hole 49b is formed which can be fitted onto a clamping support pin 50 mounted at a specified position of the support stand 31.

The clamping plate 49 is composed to be pressed from above in FIG. 4, for example, by a hydraulic operating cylinder (not shown in the figure) so as to be fixed, when breaking and dividing the con'rod.

In the embodiment of FIG. 3 and FIG. 4, the pressurizing mechanism of the present invention is composed such that a concave portion 32a is formed at a part facing to the opposite part (portion to be broken and divided) of the left and right portions 37a, 37b of the split mold 37; that is, at the corresponding positions of the presser plates 32 on the extension of the line a—a passing through the face to be broken and divided, in the pair of presser plates 32 in the con'rod breaking and dividing device 30. In the concave portion 32a, an angle pressurizing cap 51 whose tip is facing to the opposite part is slidably arranged so that the cap 51 can be advanced and retreated by a pressurizing bolt 53 connected to the presser plate 32 by a screw, through a rod 52 rotatably connected to the rear thereof.

Next, the operation of the pressurizing mechanism of the con'rod breaking and dividing device of the present invention which is composed as mentioned above will be described by being included in the operation of the con'rod breaking and dividing device.

First, after fixing the support stand 31 in the con'rod breaking and dividing device (by a mechanism not shown in the figure), the support plate 45 is lowered to the right in FIG. 3 by the operating cylinder 43 of the pressing mechanism 42 on the bearing cap side in advance. Moreover, the pressurizing bolt 53 of the pressurizing mechanism of the present invention is turned in the loosening direction, and the pair of pressurizing caps 51 are lowered in advance.

In this state, as shown in FIG. 3, the small end portion 6 of the con'rod 1 and the bearing portion 5 on the large end portion side are respectively fitted and seated onto the small end reference pin 40 and the split mold 37. In the inner surface of the bearing portion 5 of the con'rod 1, notches 5a are formed in advance in the face to be broken and divided in accord with the opposite parts of the left and right portions 37a, 37b of the split mold 37.

The support plate 45 is advanced to the left in FIG. 3 and FIG. 4 by the operating cylinder 43 of the pressing mechanism 42 on the bearing cap side, and the pressing hardware 48 of the mechanism 42 is pressed to be in contact with the left and right seats 3a of the bearing cap portion 3.

Furthermore, the pressurizing bolt 53 of the pressurizing mechanism of the present invention is turned, and the pressurizing cap 51 is advanced in the concave portion 32a by way of the rod 52, and the tip of the cap 51 is pressed to be in contact with the outside of the large end portion 4 at a location corresponding to the notch 5a in the con'rod 1 and a specified force (about 1 kgf-m) is applied.

Next, the elongated hole 49b of the clamping plate 49 is fitted onto the clamping support pin 50, and while performing adjustment by using the elongated hole 47b, the concave portion 47a on the opposite side is brought into contact with the left portion 37a of the split mold 37. In this state, the clamping plate 49 is pressed from above and fixed by the operating cylinder (not shown in the figure) or the like.

Here, as shown in FIG. 3 and FIG. 4, if the wedge 18 is forced into the wedge hole 39 of the split mold 37 by pressurizing means (not shown in the figure), the bearing cap portion 3 is broken and divided from the face to be broken and divided, and it separates from the main body side and moves together with the right portion 37b of the split mold 37 and the movable plate 36 on the bearing cap side, while making the support plate 45 of the pressing mechanism 42 on the bearing cap side or the like retreat to the right.

At this moment, a crack caused from the notch 5a rapidly progresses while being directed to the pressurizing point at the tip of the cap 51 of the pressurizing mechanism of the present invention, and the bearing cap portion 3 is broken and divided along the line a—a passing through the face to be broken and divided. Furthermore, at this moment, the deformation near the bearing portion 5 is small.

Therefore, in the pressurizing mechanism of the con'rod breaking and dividing device according to the present invention, when a wedge is forced into the bearing portion on the large end portion side through the split mold to break and divide the main body and the bearing cap portion, the directing thereof is performed so that the main body and the bearing cap portion can be broken and divided precisely at the face to be broken and divided, and in the meantime, there is such an effect that breaking and dividing are easily performed so that the deformation near the bearing portion can be made minimum.

EXPLANATION OF REFERENCE NUMERALS

1: con'rod
2: main body
3: bearing cap portion
4: large end portion
5: bearing portion
5a: notch
6: small end portion
11, 31: support stand
12, 40: small end reference pin
13, 35: stationary plate on the con'rod main body side
14, 36: movable plate on the bearing cap portion side
15: movable pressing portion
16: escaping force receiving pin
17: split mold
18: wedge
19: guide plate
20: pressurizing mechanism
21: support block
22, 53: pressurizing bolt
23, 52: rod
24, 51: pressurizing cap
32: presser plate
33: guide rail
34: bolt
38: small bolt
39: wedge hole
41: adjusting ring
42: pressing mechanism on the bearing cap portion side
43: hydraulic operating cylinder
44, 52: rod
45: support plate
46: adjusting bolt
47: adjusting nut
48: pressing hardware
49: clamping plate
50: support pin

What is claimed is:

1. A device for breaking an enlarged bearing portion of a connecting rod along a predetermined break line to divide the enlarged bearing portion into a main body portion and a bearing cap portion, comprising:

a longitudinally movable pressing mechanism for engaging the bearing cap portion of the connecting rod;

a stationary clamping mechanism for engaging a main body portion of the connecting rod, said pressing mechanism and said clamping mechanism being longitudinally spaced apart to receive and secure the enlarged bearing portion of the connecting rod;

a split mold having two mold parts and located to extend through a central aperture in the enlarged bearing portion of the connecting rod when the rod is secured;

a pressurizing mechanism located between said pressing mechanism and said clamping mechanism and including first and second opposed, laterally spaced, pressurizing caps adapted to engage opposite sides of the enlarged bearing portion of the connecting rod when the rod is secured, said caps defining opposite ends of the predetermined break line so that the break line extends between said pressing mechanism and said clamping mechanism and through the enlarged bearing portion; and a wedge for separating the two mold parts of said split mold to break, along the predetermined break line, the enlarged bearing portion of the connecting rod secured by said clamping mechanism and said pressing mechanism.

2. The device of claim 1, wherein said pressing mechanism is operably connected to a hydraulic cylinder to secure the connecting rod for breaking.

3. The device of claim 1, wherein at least one of said pressurizing caps is adjustable to cause said caps to engage and apply a force to opposite sides of the enlarged bearing portion of the connecting rod.

4. The device of claim 1, wherein said pressurizing caps are adjustable to apply pressure along the predetermined break line to opposite sides of the enlarged portion of the connecting rod secured between said pressing mechanism and said clamping mechanism.

5. The device of claim 4, wherein said pressurizing caps are adapted to engage corresponding notches on opposite sides of the enlarged portion of a connecting rod.

* * * * *